United States Patent
Annigeri et al.

(10) Patent No.: US 12,272,138 B1
(45) Date of Patent: Apr. 8, 2025

(54) FORWARD COLLISION WARNING

(71) Applicant: Samsara Inc., San Francisco, CA (US)

(72) Inventors: Rohit Annigeri, Santa Clara, CA (US); Sharan Srinivasan, Sunnyvale, CA (US); Kevin Lai, Redmond, WA (US); Jose Cazarin, Calgary (CA); Brian Westphal, Livermore, CA (US); Shiva Bala, San Diego, CA (US); Ivan Stoev, Santa Barbara, CA (US); Douglas Boyle, Verdi, NV (US); Cole Jurden, Kansas City, MO (US); Margaret Irene Finch, Austin, TX (US); Rachel Demerly, New York, NY (US); Maya Krupa, Souh Lake Tahoe, CA (US); Shirish Nair, Shoreline, WA (US); Nathan Hurst, Seattle, WA (US); Yan Wang, Mercer Island, WA (US); Shaurye Aggarwal, Evanston, IL (US); Akshay Raj Dhamija, Campbell, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/750,793

(22) Filed: Jun. 21, 2024

(51) Int. Cl.
*G06V 20/40* (2022.01)
*B60Q 9/00* (2006.01)
(Continued)

(52) U.S. Cl.
CPC .......... *G06V 20/44* (2022.01); *B60Q 9/008* (2013.01); *G06V 10/764* (2022.01);
(Continued)

(58) Field of Classification Search
CPC .... G06V 20/44; G06V 10/764; G06V 10/774; G06V 10/776; G06V 10/945; G06V 10/95; G06V 20/46; G06V 20/58; B60Q 9/008
(Continued)

(56) References Cited

U.S. PATENT DOCUMENTS

| 6,737,963 B2 | 5/2004 | Gutta et al. |
| 9,542,847 B2 | 1/2017 | Sherony et al. |

(Continued)

FOREIGN PATENT DOCUMENTS

KR 20180047149 A * 5/2018 ............ B60W 50/14

OTHER PUBLICATIONS

"Unprecedented Visibility More Platform Power Everything You Need to Know From the Vision 24 Motive Innovation Summit", [Online]. Retrieved from the Internet: https: gomotive.com blog vision-24-product-announcements , (Apr. 10, 2024), 13 pgs.

(Continued)

*Primary Examiner* — Marnie A Matt
(74) *Attorney, Agent, or Firm* — Schwegman Lundberg & Woessner, P.A.

(57) ABSTRACT

Techniques are presented for the detection and management of collision warning (CW) events. A training dataset comprising videos of vehicle collisions and non-collisions, sensor readings, environmental conditions, and more is utilized to train a CW classification model for detecting potential collision events in vehicles. A backend CW classification model, with greater computational resources, employs a more complex neural network to review CW events received by the Behavioral Monitoring System (BMS) based on video data, achieving higher precision and reducing false positives. The CW model is installed in vehicles for real-time detection, while the backend model is deployed at the BMS.

(Continued)

The BMS validates detected CW events, filters out false positives, and streamlines the review process for fleet administrators and customers. Additional BMS filtering operations include assessing non-proximity-related CW events and camera impairments, with the filtered CW events presented for review in the safety inbox.

20 Claims, 13 Drawing Sheets

(51) Int. Cl.
*G06V 10/764* (2022.01)
*G06V 10/774* (2022.01)
*G06V 10/776* (2022.01)
*G06V 10/94* (2022.01)
*G06V 20/58* (2022.01)

(52) U.S. Cl.
CPC .......... *G06V 10/774* (2022.01); *G06V 10/776* (2022.01); *G06V 10/945* (2022.01); *G06V 10/95* (2022.01); *G06V 20/46* (2022.01); *G06V 20/58* (2022.01)

(58) Field of Classification Search
USPC ........................................................ 348/148
See application file for complete search history.

(56) References Cited

U.S. PATENT DOCUMENTS

| | | | |
|---|---|---|---|
| 10,155,445 B2 | 12/2018 | Nemat-Nasser | |
| 10,173,685 B2 | 1/2019 | Schaper et al. | |
| 10,272,838 B1 | 4/2019 | Pertsel | |
| 10,745,009 B2* | 8/2020 | Jang ........................ | G06V 20/56 |
| 11,318,949 B2* | 5/2022 | el Kaliouby ....... | G06Q 30/0265 |
| 11,352,013 B1* | 6/2022 | Srinivasan ............ | B60W 40/04 |
| 11,386,325 B1* | 7/2022 | Srinivasan ............ | B60W 50/14 |
| 11,830,259 B2* | 11/2023 | Ren ....................... | G06V 40/172 |
| 11,989,949 B1 | 5/2024 | Mazumder et al. | |
| 11,993,277 B2* | 5/2024 | Julian .................... | B60W 50/14 |
| 12,056,922 B2* | 8/2024 | Tsai ....................... | G08G 1/012 |
| 12,112,555 B1 | 10/2024 | Lee et al. | |
| 2007/0159311 A1 | 7/2007 | Schober | |
| 2012/0147189 A1* | 6/2012 | Zhang .................... | G06V 20/56 |
| | | | 382/104 |
| 2012/0206252 A1 | 8/2012 | Sherony et al. | |
| 2017/0001520 A1 | 1/2017 | Nemat-nasser | |
| 2018/0170375 A1* | 6/2018 | Jang ................. | B60W 30/0956 |
| 2019/0310654 A1* | 10/2019 | Halder .................. | B60W 60/00 |
| 2019/0389487 A1 | 12/2019 | Gowda et al. | |
| 2020/0125861 A1 | 4/2020 | Sota et al. | |
| 2020/0228646 A1 | 7/2020 | Hotes et al. | |
| 2020/0342235 A1* | 10/2020 | Tsai ........................ | G06V 20/46 |
| 2021/0156963 A1* | 5/2021 | Popov .................... | G06N 3/045 |
| 2021/0179092 A1 | 6/2021 | Chen et al. | |
| 2022/0126864 A1 | 4/2022 | Moustafa et al. | |
| 2022/0289203 A1 | 9/2022 | Makilya et al. | |
| 2022/0324467 A1* | 10/2022 | Alvarez ........... | G08G 1/096725 |
| 2023/0065491 A1* | 3/2023 | Ren ........................ | G06N 3/045 |
| 2023/0112797 A1 | 4/2023 | Sicconi et al. | |
| 2023/0154204 A1 | 5/2023 | Kahn et al. | |
| 2023/0219592 A1* | 7/2023 | Calmer ..................... | G06T 7/70 |
| | | | 348/148 |
| 2023/0298410 A1* | 9/2023 | Calmer ................ | G07C 5/0816 |
| | | | 701/31.4 |
| 2023/0303101 A1 | 9/2023 | Kuehnle et al. | |
| 2023/0351769 A1* | 11/2023 | Wu ....................... | G06V 10/762 |
| 2024/0053763 A1* | 2/2024 | Halder ................. | G05D 1/0088 |
| 2024/0062667 A1 | 2/2024 | Kemble et al. | |
| 2024/0096116 A1* | 3/2024 | Alpert ...................... | G06N 3/08 |
| 2024/0198180 A1 | 6/2024 | Chen et al. | |
| 2024/0208522 A1 | 6/2024 | Verma et al. | |
| 2024/0219716 A1 | 7/2024 | Chen et al. | |

OTHER PUBLICATIONS

"U.S. Appl. No. 18/634,353, Notice of Allowance mailed Jul. 17, 2024", 9 pgs.

"U.S. Appl. No. 18/643,164, Notice of Allowance mailed Aug. 12, 2024", 5 pgs.

"U.S. Appl. No. 18/672,665, Non Final Office Action mailed Aug. 23, 2024", 8 pgs.

"U.S. Appl. No. 18/664,773, Non Final Office Action mailed Aug. 28, 2024", 10 pgs.

"U.S. Appl. No. 18/672,665, Response filed Nov. 6, 2024 to Non Final Office Action mailed Aug. 23, 2024", 17 pgs.

"U.S. Appl. No. 18/643,164, Corrected Notice of Allowability mailed Nov. 12, 2024", 2 pgs.

"U.S. Appl. No. 18/664,773, Response filed Nov. 20, 2024 to Non Final Office Action mailed Aug. 28, 2024", 12 pgs.

U.S. Appl. No. 18/808,818, filed Aug. 19, 2024, Drowsy Driving Detection.

U.S. Appl. No. 18/923,359, filed Oct. 22, 2024, Lane Departure Monitoring.

"U.S. Appl. No. 18/808,818, Non Final Office Action mailed Nov. 26, 2024", 11 pgs.

"U.S. Appl. No. 18/923,359, Non Final Office Action mailed Dec. 5, 2024", 8 pgs.

* cited by examiner

FIG. 5

FORWARD COLLISION WARNING

TECHNICAL FIELD

The subject matter disclosed herein generally relates to methods, systems, and machine-readable storage media for vehicle safety technologies, including methods, systems, and machine-readable storage media for monitoring operator behavior to enhance safety protocols.

BACKGROUND

Fleet managers rely on the analysis of images from inside and outside vehicles to determine events that affect the safe driving of the vehicle, such as improper driver behavior, accident investigation, speeding, collision warning, tailgating, hazardous conditions, etc.

A collision warning system for vehicles is a safety feature designed to alert drivers when there is a high probability of a collision with another vehicle, pedestrian, or obstacle in the vehicle's path. When the system detects a potential collision, a collision warning (CW) provides visual, auditory, or haptic alerts to warn the driver to take evasive action, such as braking or steering, to avoid the impending collision. Collision warning systems are an important component of advanced driver assistance systems (ADAS) and can help prevent accidents and save lives on the road.

Generating collision warnings at a vehicle may be challenging because of the need to constantly evaluate the possibility of collision and having to perform calculations quickly; otherwise, the collision warning may arrive too late to be effective. Further, the devices on the vehicle may have a limited amount of computing resources available for the constant evaluation of the CW events, so generating high-quality and timely CWs may require the optimal use of the available computing resources.

BRIEF DESCRIPTION OF THE DRAWINGS

Various appended drawings illustrate examples of the present disclosure and cannot be considered limiting its scope.

FIG. 5 shows a UI for reviewing behavior events according to some examples.

DETAILED DESCRIPTION

Figure 1:
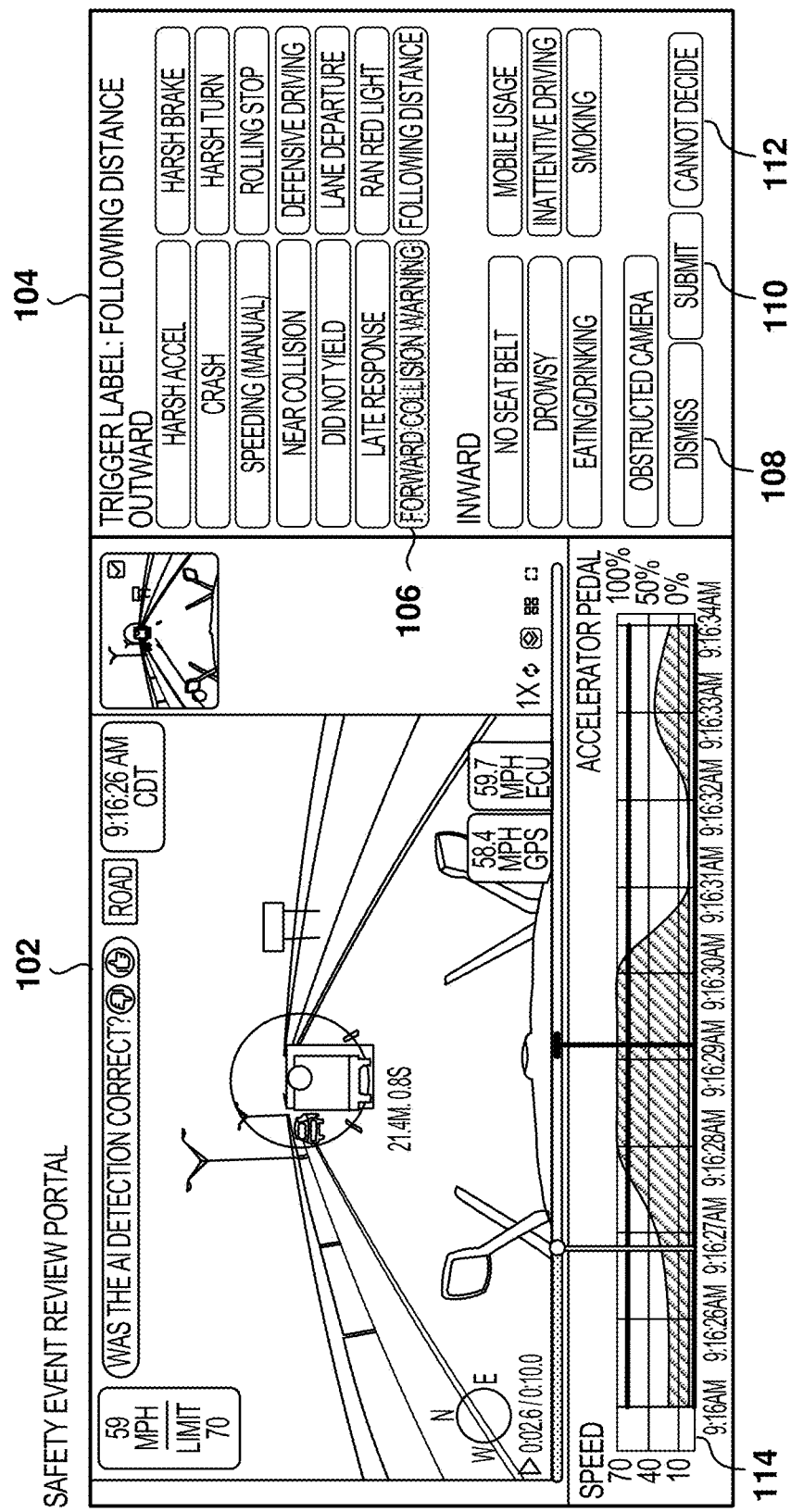
FIG. 1 is a user interface (UI) for reviewing safety events, according to some examples.

Example methods, systems, and computer programs are directed to the detection and management of collision warning (CW) events. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

To address the problem of generating CWs with limited computed resources, a machine learning (ML) model is trained to generate the CW events based on images from the road ahead of the vehicle. The ML model leverages a training dataset comprising videos with vehicle collisions and videos without collisions. The training data set is used to train the ML model to recognize common scenarios and predict the likelihood of a vehicle being involved in an accident in real-time. This approach differs from the prior solutions that solely rely on the calculation of a time-to-collision value. By utilizing crash detection data from these videos, the ML model can detect a wider range of unique scenarios.

The present disclosure provides techniques for detecting and managing collision warning (CW) events. Training data is prepared, which includes videos of collisions and non-collisions, vehicle sensor readings, environmental conditions, and more. The training data is used to train a CW classification model for the vehicle. This CW classification model is designed to predict or detect potential collision events. Although the current embodiments focus on possible collisions with a lead vehicle, the principles are applicable to other potential hazards, such as pedestrians, animals, debris, stalled vehicles, bridges, overpasses, and road dividers.

In some examples, a backend CW classification model is trained. The CW classification model reviews CW events received by the Behavioral Monitoring System (BMS) based on the video received of the CW event. Given the greater computing resources available to the backend compared to the Asset Monitoring System (AMS) at the vehicle, the backend CW classification model is typically more complex, potentially employing a neural network with additional layers and parameters and processing a greater number of video frames. As a result, the backend model achieves higher precision, effectively removes false positive inbox alerts, and maintains a low suppression rate of true positive vehicle-triggered events.

The CW model is installed in a device of the vehicle for real-time CW event detection. Similarly, the backend CW classification model is deployed on the server. The CW events at vehicles are detected using the CW model. After the CW events are sent to the BMS, the BMS validates the CW event using the backend CW classification model, which analyzes CW event videos and discards false positives. This filtering process streamlines the review process for both the fleet administrator and the customer, saving time and resources.

The BMS may perform other filtering operations on the CW events, such as detecting when the CW event was not caused by proximity to the lead vehicle or when the in-vehicle camera is impaired. After the filtering, the remaining CW events are presented for review in the fleet administrator's safety inbox.

FIG. 1 is a user interface (UI) for reviewing safety events, according to some examples. FIG. 1 illustrates an exemplary user interface of a Safety Event Review Portal for monitoring and reviewing vehicle safety events. The interface is divided into three sections: a video playback area 102, an event timeline 114, and a trigger label panel 104.

The video playback area 102 displays recorded footage of the vehicle's surroundings captured by onboard cameras. This area includes overlaid graphics, such as bounding boxes that indicate the detection of objects, such as the vehicle in front. Additional information, such as vehicle speed, is displayed alongside the video feed.

Below the video playback area is the event timeline 114, which provides a graphical representation of the vehicle's speed over time and highlights the duration of the safety event. The event timeline 114 includes a playback scrubber that allows users to navigate through the recorded event. By moving the position of the scrubber along the timeline, users can pinpoint and view specific moments in time within the video (i.e., specific image frames of the video data that correspond with a time defined by the location of the scrubber along the timeline). The data presented within the event timeline 114, such as vehicle speed or other telematics, corresponds directly to the content being displayed in the video at that particular moment.

The trigger label panel 104 is organized into three sections, each with interactive elements for categorizing the nature of the safety event. The first section includes outward-facing events such as harsh acceleration, crash, following distance, and forward collision warning 106. The second section lists inward-facing events that may involve the driver, including, but not limited to: no seat belt usage, drowsiness, and mobile usage.

The third section contains action buttons for categorizing the event. The action buttons include a dismiss button 108, a submit button 110, and a cannot decide button 112. The dismiss button 108 is for dismissing the event because the review showed that the respective event did not really happen (e.g., the driver was not in danger of a collision threat. Some of the events detected may be "false alarms," also referred to herein as false positives; that is, the event may have been flagged as a forward collision warning, but there may not have been a collision threat for several reasons, such as the model detected a vehicle in another lane, some problem with the camera, etc. The reviewer may check the event by reviewing the video and then decide if the event was "real" (a true positive) or if the event was "false" (a false positive). If the reviewer decides that the event was a false positive, then the event will be discarded. If the reviewer decides that the event was a true positive, then the event will be submitted to a Safety Inbox of the customer for customer review. If the reviewer cannot make a determination, then the reviewer can select the option "cannot decide," and the event will be submitted to the Safety Inbox based on configuration parameters.

When the event is dismissed, the dismissed event will not be shown to the end user. This saves time for the end user, so the end user does not have to waste time inspecting false positives.

One problem being addressed is the prevention of forward collisions. However, the system also provides the additional benefit of increased visibility for customers in near collisions. The standard for forward collision warning is defined by the ISO and is commonly integrated into Advanced Driver Assistance Systems (ADAS) in vehicles. These systems typically use radar sensors to calculate the time to collision between vehicles. This calculation considers the speeds of both vehicles and the distance between them. When the time to collision falls below a certain threshold, alerts such as automatic braking may be triggered.

In some examples, a machine-learning (ML) model is used to identify CW events, which are events where there is a high probability of a collision with another vehicle, pedestrian, or some other obstacle in the vehicle's path (e.g., a traffic sign, the pillar of an overpass). The ML model uses as input images captured by the forward-facing camera in the vehicle, also referred to herein as the outward camera. The ML model has to have high accuracy because otherwise, the model may generate a large number of false positives, which may generate too many alarms at the vehicle and require a significant amount of time to review the events. Further, the model should capture every possible true CW event because of the high cost of a collision.

Figure 2:
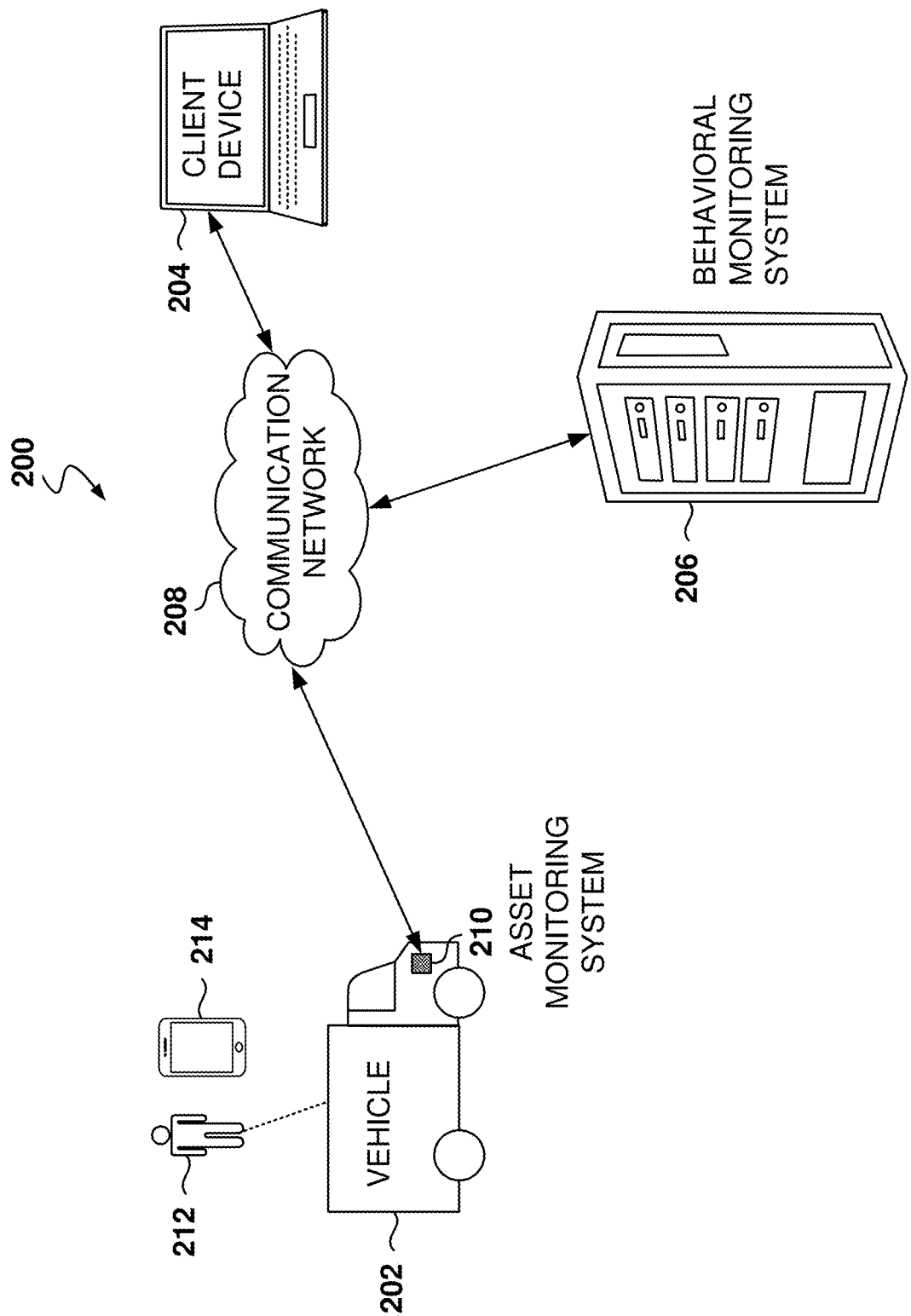
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

According to some examples, the vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The AMS 210 may include one or more hardware devices to perform monitoring functions at the vehicle. In some examples, the AMS 210 includes a communications device that is a hardware device that acts as a network access point for the AMS 210. For example, the communications device can be established as an edge device of a network or system of nodes within the vehicle 202.

The AMS may include a variety of sensors, computing devices (e.g., electronic control units (ECUs), actuators, etc., deployed within the vehicle. According to certain examples, the AMS may encompass a variety of sensors, including speed sensors for monitoring vehicle velocity, accelerometers, and gyroscopes for detecting changes in motion and orientation, and cameras for visual data acquisition to support functions like lane departure detection. It may also employ radar and LIDAR sensors for distance measurements (i.e., for adaptive cruise control), temperature sensors for monitoring engine and cabin conditions, pressure sensors for system diagnostics such as tire and hydraulic pressures, and fuel level sensors for managing refueling schedules and efficiency calculations. The communications device in the AMS facilitates wireless communication capabilities by connecting to wireless networks (e.g., cellular, wireless local area network, satellite communication networks, etc.) for communicating with remote computing devices. The communications device may also provide additional functionality, such as firewall functionality to filter inbound and outbound communications, disallow incoming communications from suspicious or unauthorized sources, etc.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

To utilize the functionality of the behavioral monitoring system 206, users (e.g., administrators and fleet managers) may use the client device 204. Although the shown system 200 includes only one client device 204 and one vehicle 202, this is only for ease of explanation and is not meant to be limiting. One skilled in the art would appreciate that the system 200 could include any number of client devices 204 and vehicles 202. Further, the behavioral monitoring system 206 may concurrently accept communications from and initiate communication messages and interact with any number of client devices 204 and vehicles 202, and support connections from a variety of different types of client devices 204.

According to some examples, a user interacts with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The behavioral monitoring system 206 may provide a user interface that allows administrators to configure the triggering conditions. Each triggering condition defines one or more individual conditions that, if satisfied, indicates the occurrence of an undesirable behavior or a critical event such as a collision. For example, a triggering condition may define one or more terms or a string of terms that, if detected by one or more sensor devices associated with the behavioral monitoring system 206, indicate the use of offensive, derogatory, and otherwise undesirable language. As another example, a triggering condition may define unsafe lane-departure events.

Each triggering condition may also be associated with a corresponding set of response actions to be performed by the behavioral monitoring system 206 if the triggering condition has been satisfied. For example, the response actions may include notifying the driver of a dangerous condition (e.g., drowsy driving, lane departure), transmitting alerts to specified users/user devices, generating incident reports based on corresponding triggering conditions, modifying the mode of operation of sensors or the vehicle, and the like.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent. Similarly, the user interface enables the administrator to define actions for generating an incident report based on the detected occurrence of undesirable behavior. For example, the user interface enables the administrator to provide inputs to define a modified mode of operation of the sensors in the vehicle 202 to be initiated to capture additional data for inclusion in the incident report. This may include increasing the number of sensors used to capture data, such as by initiating the use of video cameras or microphones, increasing the performance of the sensors that are in use, such as by increasing the resolution used to capture video, and modifying the positioning of the sensors, such as by changing the angle or view of a camera to capture the detected action better.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
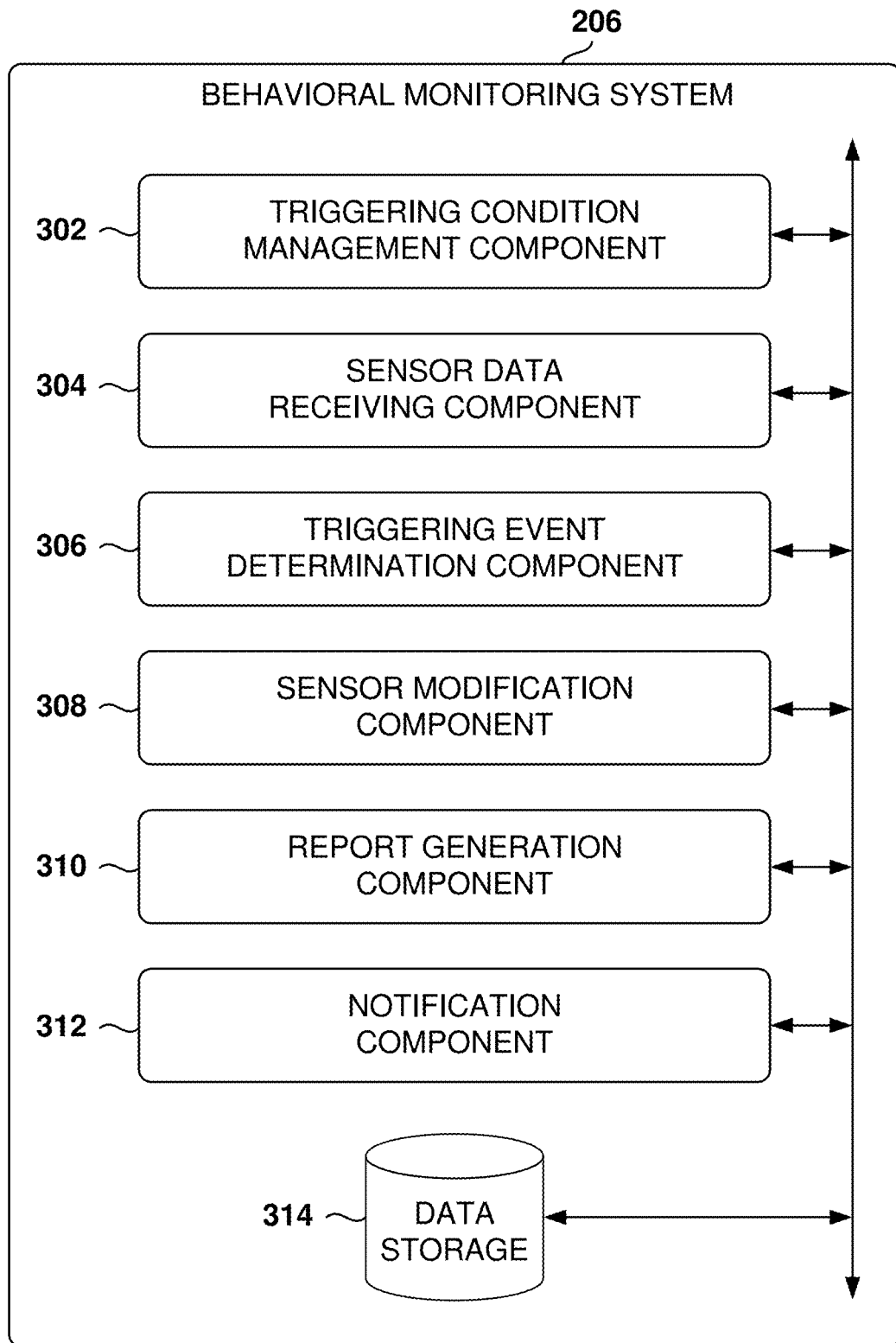
FIG. 3 is a block diagram of a Behavioral Monitoring System (BMS), according to some examples.

FIG. 3 is a block diagram of a behavioral monitoring system 206 (BMS), according to some examples. To avoid obscuring the inventive subject matter with unnecessary detail, various functional components (e.g., modules) that are not germane to conveying an understanding of the inventive subject matter have been omitted from FIG. 3. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on one or more of a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions is detected within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
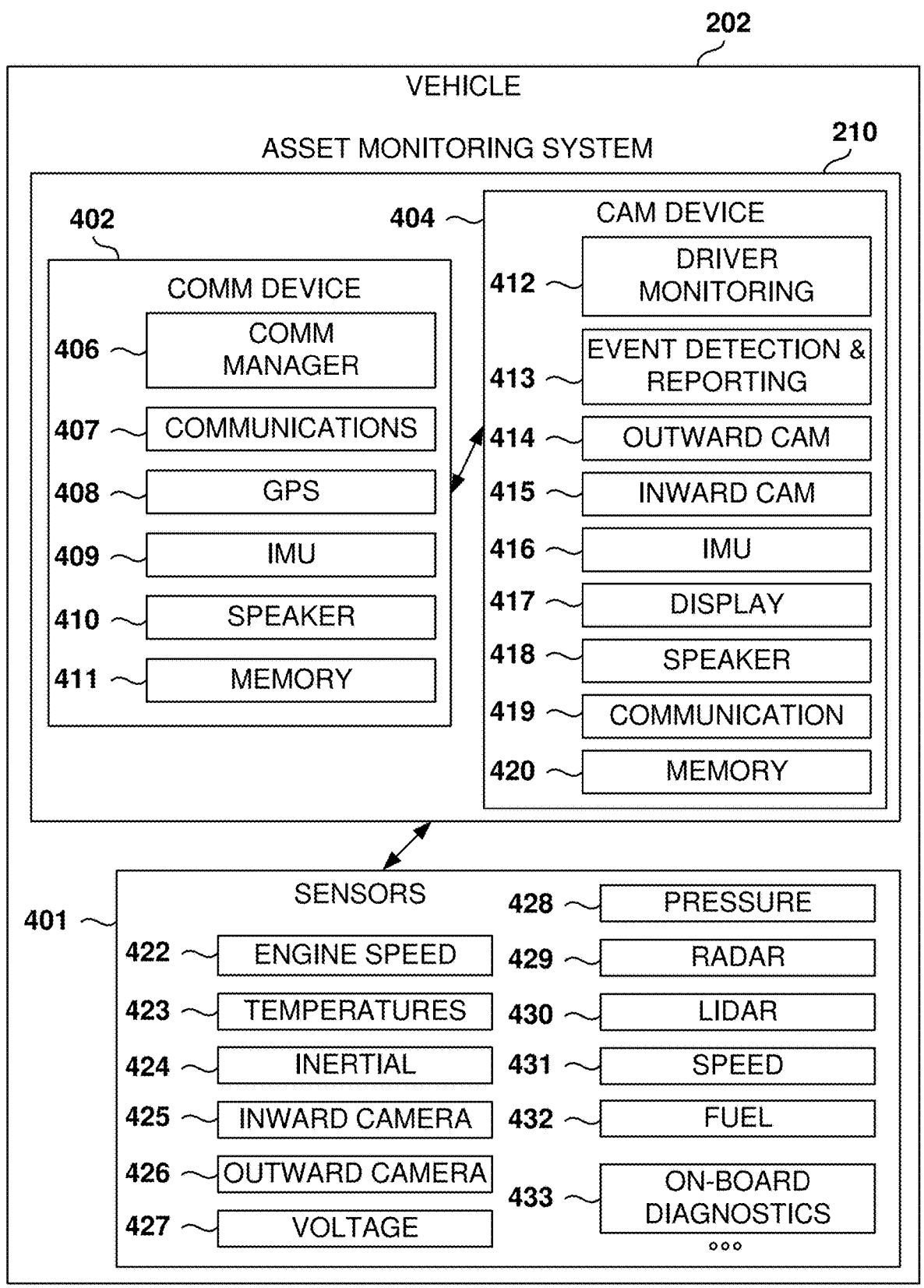
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described below, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
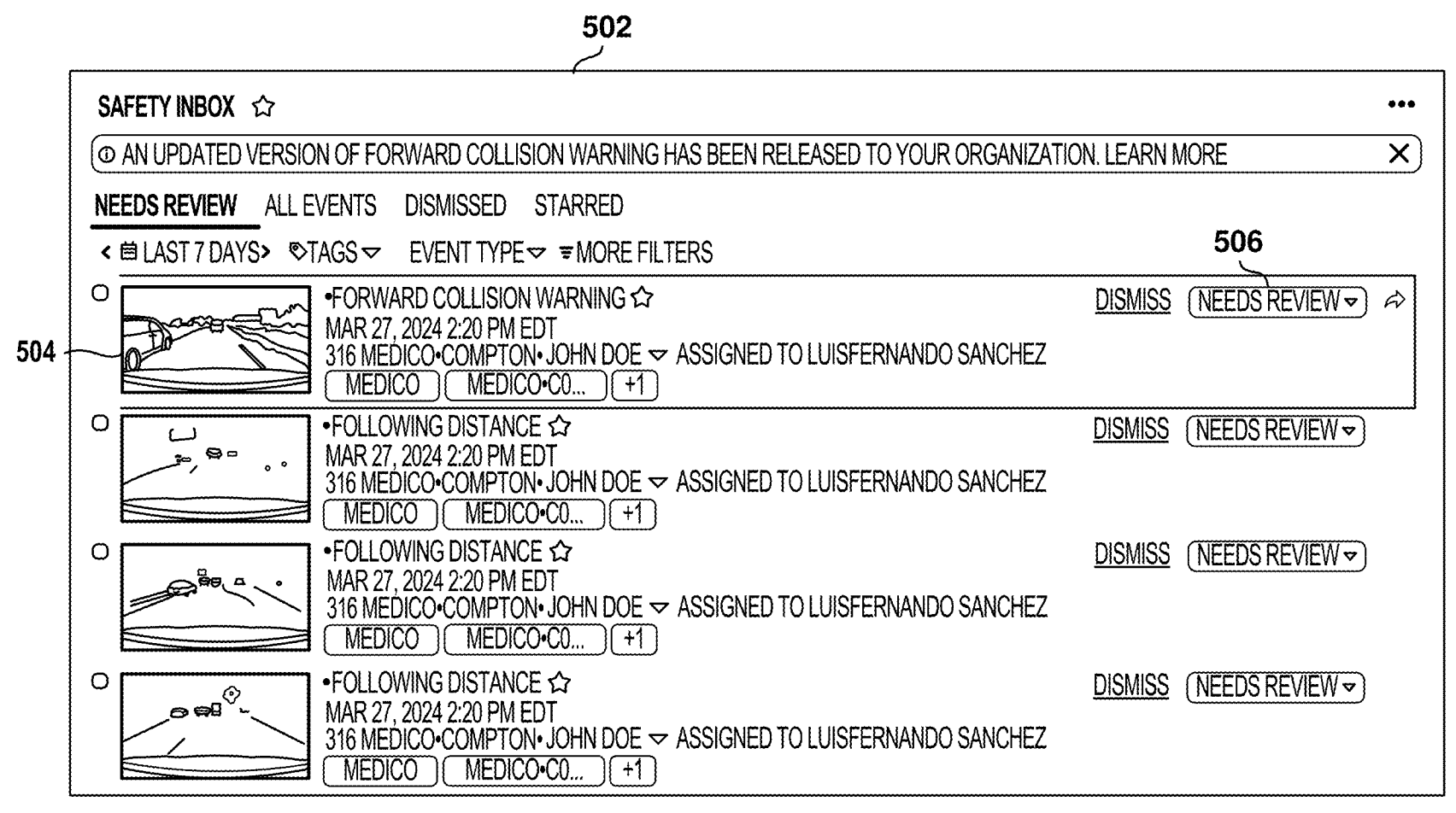

FIG. 5 shows a UI 502 for reviewing behavior events according to some examples. The UI 502 is for a Safety Inbox that includes the events received by the BMS for the administrator's review. The UI 502 includes a header section at the top indicating the title "Safety Inbox." Below the title, in the illustrated example, a notification bar provides an update message regarding a feature related to Forward Collision Warning, with an option for the user to learn more about the update.

The main portion of the interface displays a list of events 504 for review. Each event 504 is represented by a row containing a thumbnail image, event information, and associated metadata. The events can be further organized by various filters such as "All Events," "Dismissed," and "Starred." Additional filtering options are available, including "Last 7 Days," "Tags," "Event Type," and "More Filters."

A drop-down menu 506 provides multiple options to take based on the event, such as needs review, needs coaching, needs recognition, coached, reviewed, recognized, and dismissed.

Each event 504 entry includes a label such as "Forward Collision Warning," indicating the type of event, a timestamp indicating the date and time of the event, and the name of an individual associated with the event.

The UI 502 provides interactive elements such as buttons to dismiss an event or mark it as needing review. Navigation controls for sorting and searching through events, as well as pagination controls, are located at the top right of the list area.

The design of the UI 502 aims to facilitate the monitoring and management of safety-related events within an organizational context, allowing for efficient review and action by administrators responsible for safety oversight. If an event 504 is selected, a page for a detailed review of the event is presented, such as the one illustrated in FIG. 1.

Figure 6:
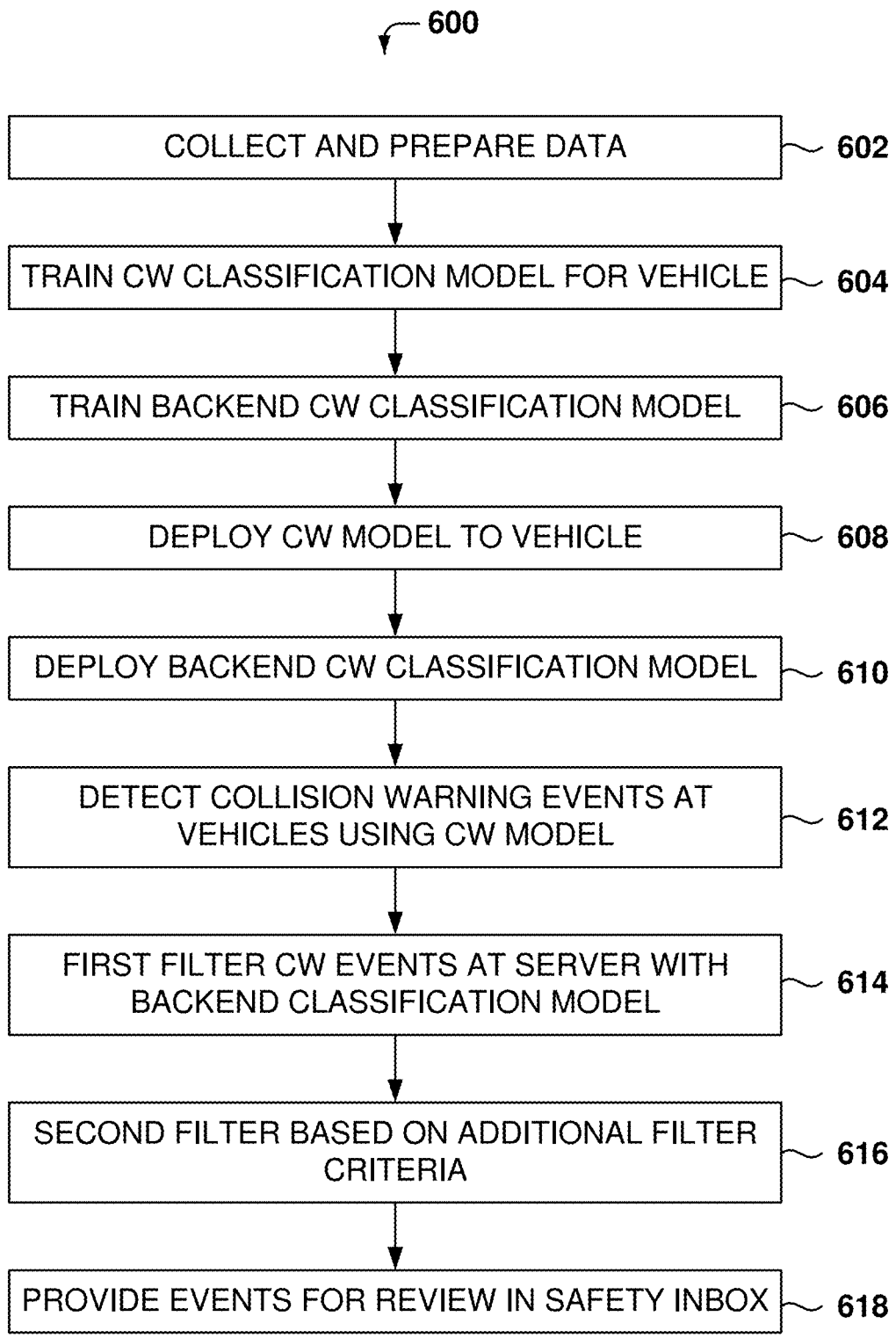
FIG. 6 is a flowchart of a method for the detection and management of collision warning (CW) events, according to some examples.

FIG. 6 is a flowchart of a method 600 for the detection and management of collision warning (CW) events, according to some examples. Operation 602 involves collecting and preparing data, such as videos of collisions and not collisions, vehicle sensor readings, environmental conditions, etc.

From operation 602, the method 600 flows to operation 604 for training a CW classification model for the vehicle. The CW model will be used to predict or detect potential collision events. It is noted that the current embodiments are described with reference to possible collisions with a lead vehicle; however, the same principles may be used to detect collisions with other items, such as people, animals, debris on the road, stalled vehicles, bridges, overpasses, road dividers, etc. The examples presented should therefore not be interpreted to be exclusive or limiting, but rather illustrative.

From operation 604, the method 600 flows to operation 606 for training a backend CW classification model. The backend CW classification model is used to review CW events received by the BMS and uses as input, at least, the video received of the CW event. The backend has more computing resources available than the AMS at the vehicle, so the backend CW classification model will be more complex, in some examples, than the CW model at the vehicle, e.g., use a neural network with more layers and parameters, process a larger number of video frames, etc. Thus, the backend CW classification model has higher precision, removes false positive inbox alerts, and maintains a low true positive suppression rate of firmware-triggered events.

Operation 608 is the deployment of the CW model to the vehicle. This operation puts the previously trained CW model into active use within the vehicle's systems, enabling real-time CW event detection. Similarly, operation 610 involves deploying the backend CW classification model.

Operation 612 is the detection of collision warning events in vehicles using the CW model. This is where the onboard CW model identifies potential collision scenarios in real time. More details regarding the CW models are provided below with reference to FIGS. 7-9.

Operation 614 represents the first filtering of CW events at the server with the backend CW classification model. The backend CW classification model analyzes the CW event videos and discards those events that are considered false positives. This filtering reduces the number of events that the reviewer and the customer have to process, saving time and expenses.

Operation 616 is the second filtering based on additional filter criteria. More details are provided below with reference to FIG. 11.

Further, operation 618 is providing events that were not previously filtered out for review in the safety inbox of the fleet administrator.

Overall, the method 600 provides a systematic approach to managing CW events, which enhances vehicle safety, reduces the likelihood of collisions, and eliminates false positives.

Figure 7:
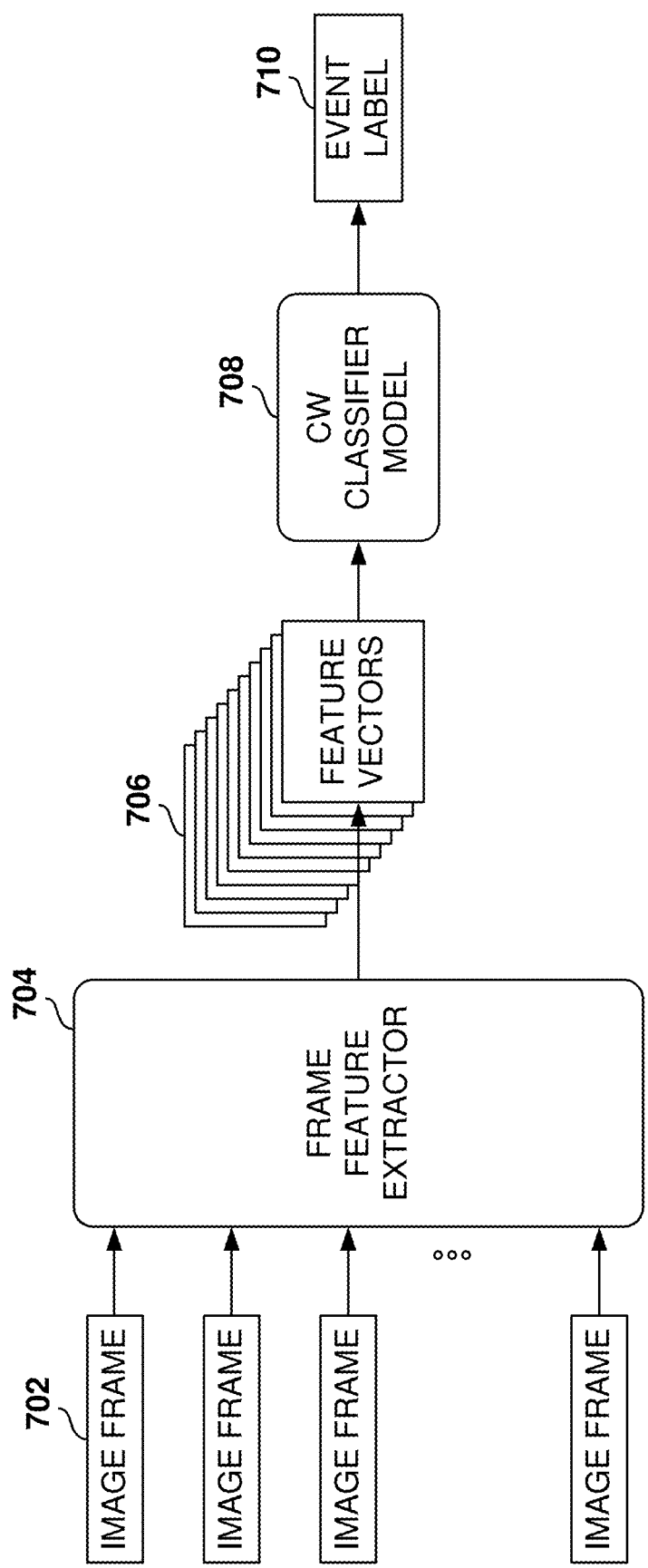
FIG. 7 illustrates the use of a classifier for detecting CW events, according to some examples.

FIG. 7 illustrates the use of a classifier for detecting CW events, according to some examples. FIG. 7 delineates a sequence to process image frames to classify and label events.

Each image frame 702 is used as input to a frame feature extractor 704 that generates a feature vector 706 for each of the images. In some examples, each image frame is converted into a vector containing all, or part of, the pixels in the image. Further, there may be other preprocessing operations for each image frame, such as conversion to RGB-pixel format and image resizing or cropping. In some examples, each image frame 702 is a vector of 512 real numbers, but other types and sizes of embeddings may be used.

The frame feature extractor 704 is trained to produce embeddings, e.g., the feature vectors 706, based on the data in the training set. In some examples, the image frames 702 are extracted from the video captured by the outward camera by sampling the video, e.g., six frames per second. However, other sampling frequencies may be used. In some examples, the check for CW events is performed with ten images, but other frequencies may be used, and the probability of a collision occurring within the next 2.5 seconds is calculated. In some examples, a prediction is made for every new sampled frame, and when operating at six frames per second, this will result in a prediction every 166 milliseconds.

The feature vectors 706 encapsulate the information from the image frames 702 that will be used for event detection. The number of image frames processed for each determination of CW events may vary from 1 to 50 or more. In some examples, ten image frames 702 are used each cycle to check for CW events.

Each image frame 702 is represented by the feature vector 706 which is an n-dimensional point in space, where the distance between 2 feature vectors 706 indicates how similar the image frames are, and the closer the distance, the more similar the images are. The comparison of image frames 702 yields a distance metric, which is utilized to determine the degree of dissimilarity between the images. This process involves providing the deep learning model with a spatial understanding of the frames' positions and orientations in an n-dimensional space. Based on this spatial arrangement, the model can infer potential collision scenarios or non-collision scenarios.

During training, the CW classifier model 708 is trained to group sequences of points that belong to similar categories together. For instance, sequences representing collisions are grouped together, while those representing non-collisions are placed in separate groups. The CW classifier model 708 learns to distinguish between different sequences based on their relative distances in the embedding space.

The frame feature extractor 704 is responsible for analyzing each image frame and extracting relevant features from the visual data. These features are used by the classifier to make accurate determinations about the presence of CW events. The extracted features are represented as feature vectors 706.

The feature vectors 706 are fed into the CW classifier model 708 (which could be the CW model for the vehicle or the backend), and the CW classifier model 708 generates the event label 710. The function of the CW classifier model 708 is to interpret the feature vectors and determine whether they correspond to a CW event.

In some examples, the event label includes one value, which is the probability that the CW event has occurred. In other examples, the event label includes two values: the probability that the CW event has occurred and the probability that the CW event has not occurred, which are complementary probabilities that will add up to one. Other examples may include additional labels, such as a stationary object detected, vehicle speeding, etc.

In some examples, a minimum threshold of consecutive CW events has to be detected before triggering the CW event, e.g., three consecutive CD events with a CW probability exceeding a predetermined threshold (e.g., CW probability greater than 60%, but other threshold values may be utilized).

If the CW event is triggered based on the sequence of frames, an audio alert will be generated to alert the driver, and the CW event is logged and sent to the BMS. A video clip of the event will also be sent to the BMS, e.g., a ten-second video clip capturing 6.5 seconds before the detection and 3.5 seconds after the detection.

The backend CW classification model is employed to filter and enhance the precision of the initial CW model used at the vehicle. The backend CW classification model may perform additional operations, such as using a model that determines the positions of vehicles in each frame of the video and identifies the leading vehicle. Post-processing logic is applied to validate the CW event as an inbox event if the leading vehicle is identified and the CW vehicle model is triggered; otherwise, the event is rejected from the inbox.

Figure 8:
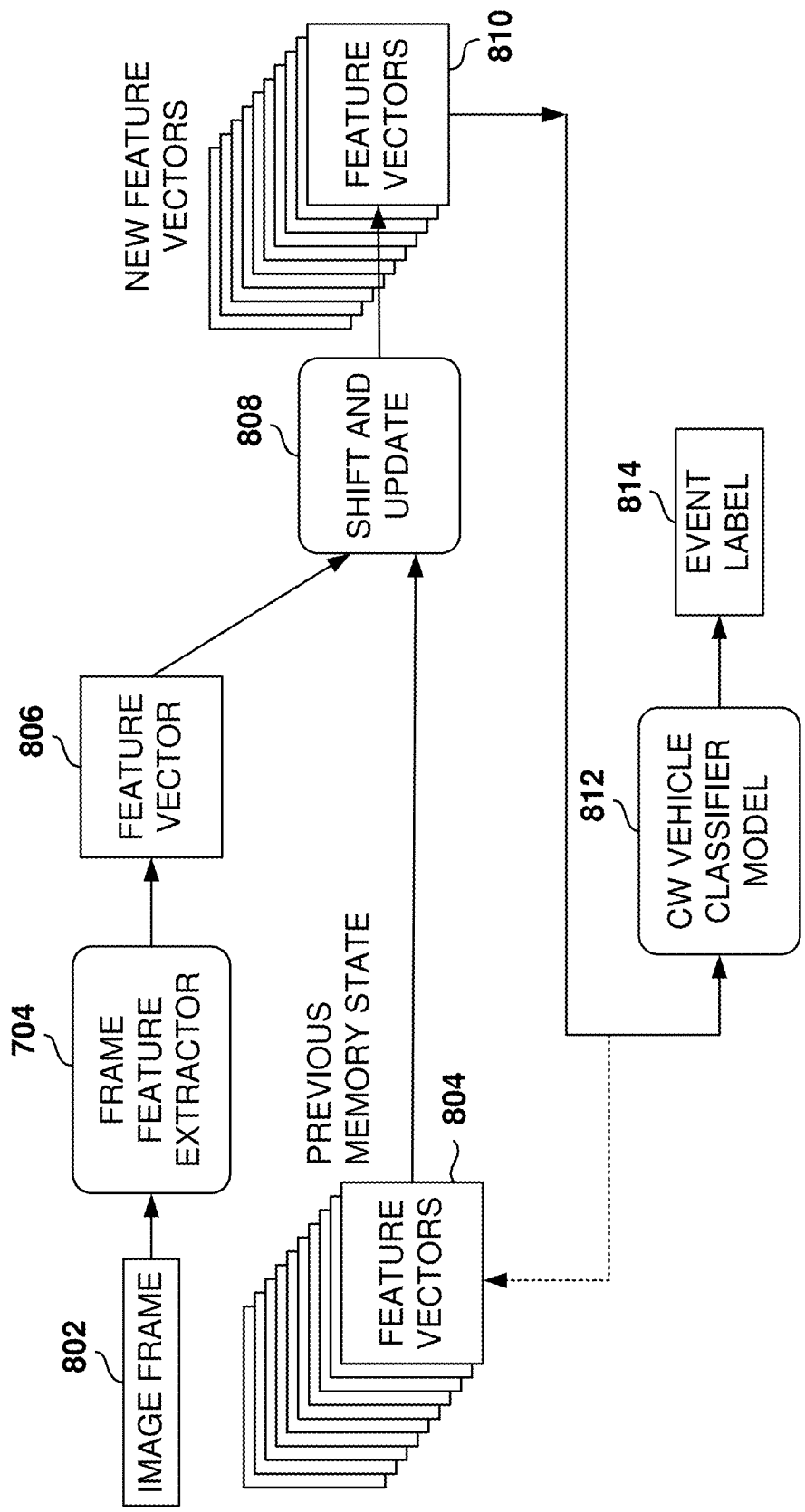
FIG. 8 illustrates the use of a classifier for detecting CW events based on historical data and a new image frame, according to some examples.

FIG. 8 illustrates the use of a CW vehicle classifier model 812 for detecting CW events based on historical data and a new image frame, according to some examples. In some examples, the computing resources in the vehicle, e.g., the cam device 404, may not be enough to process ten images each cycle (e.g., every 166 milliseconds). To solve this problem, a different approach is used by preserving the state from the previous cycle to estimate CW events.

For example, the CW vehicle classifier model 812 uses ten feature vectors each cycle, and the ten feature vectors 804 are preserved for the next cycle after estimating the CW event. In the next cycle, one image frame 802 is processed to create the feature vector 806, and this feature vector 806 is combined with the ten feature vectors 804 by dismissing the oldest feature vector 804 and adding the new feature vector 806, an operation referred to as shift and update 808 in FIG. 8.

The result of the shift and update 808 is the set of new feature vectors 810, which are used as input to the CW vehicle classifier model 812, which generates the event label 814, with the same characteristics as the event label 710 of FIG. 7.

The CW vehicle classifier model 812 is based on comparisons between pairs of frames. This comparison involves not only evaluating consecutive frames but also assessing various combinations, such as comparing the third frame with the tenth frame, the first with the fourth, etc. The comparison may identify the pixels that changed between the two image frames. This way, during training, the CW vehicle classifier model 812 learns the patterns that will identify a CW event.

These variations could stem from factors such as abrupt changes in the environment, like a vehicle ahead hitting the brakes or changing lanes. Comparing frames involves more than just calculating distances, as it may also include matrix multiplication or other operations. The process is likened to a fully connected layer attached to the embedding, where each element is compared against others to analyze the differences and similarities between frames.

Thus, the frame feature extractor 704 processes only one image frame each cycle instead of ten, reducing computing resource use.

The logic is based on the principle of using historical data (previous memory state) in conjunction with new data (new image frame) to make informed decisions. The technique demonstrates how new information is integrated with existing data to enhance the accuracy of CW event detection.

Figure 9:
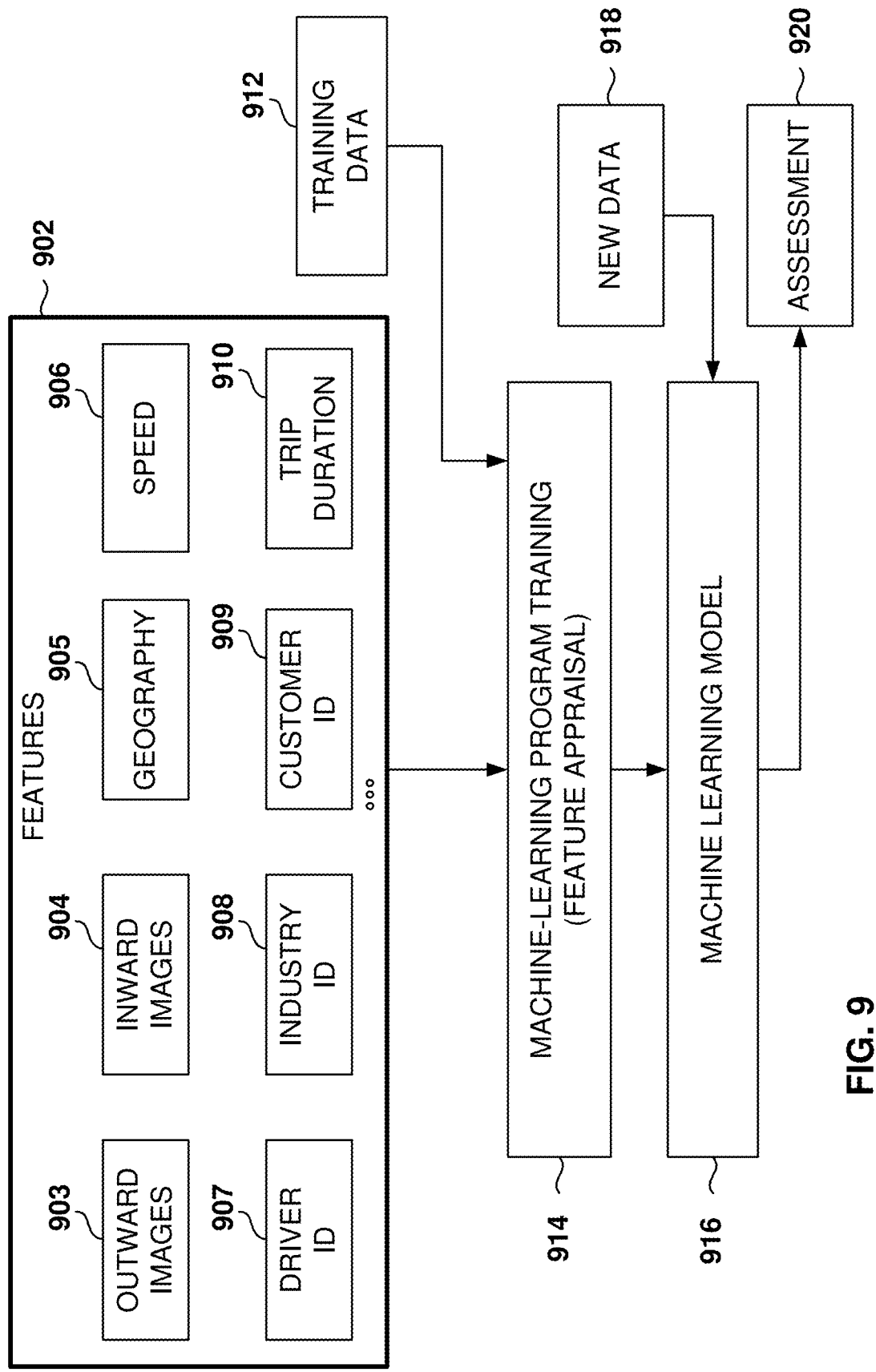
FIG. 9 illustrates the training and use of a machine-learning model, according to some example examples.

FIG. 9 illustrates the training and use of a machine-learning model 916, according to some example examples. In some examples, machine learning (ML) models 916 are utilized to perform operations associated with detecting CW events.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 916 from training data 912 in order to make data-driven predictions or decisions expressed as outputs or assessments 920. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

In some examples, the images captured by the outward camera are embedded into vectors. A plurality of images (e.g., ten images) is used to estimate the occurrence of CW events. The images are sampled from the video by choosing a number of frames each second (e.g., two frames per second, six frames per second) for the analysis for a predetermined number of seconds (e.g., 1.5 seconds, 2 seconds). In some examples, six frames are used per second for the last 1.66 seconds, but other sampling frequencies and time windows may be used. Estimating CD events is calculated periodically, such as six times a second twice a second, but other calculating frequencies may also be used.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 916 outputs a value that is the probability of a collision within a predetermined part of time (e.g., 2.5 seconds). In other examples, ML model 916 outputs two values corresponding to the probability of a collision and the probability of not having a collision.

The training data 912 comprises examples of values for the features 902. In some examples, the training data comprises labeled data with examples of values for the features 902 and labels indicating the outcome, such as collision occurred or collision did not occur. The machine-learning algorithms utilize the training data 912 to find correlations among identified features 902 that affect the outcome.

In some examples, the training data 912 includes data for true positive events, such as videos or images of collisions, distracted driving or mobile phone usage events followed by a harsh change in IMU/accelerometer, emergency events like harsh braking, etc. Other training data may include true false events, such as videos or images of events without a threat of collision, absence of emergency events, no sudden changes in IMU data, etc. In some examples, the training data 912 includes labels created by human judges to note if the video corresponded or not to a CW event.

Some of the training data was collected after a collision occurred, which would cause the cam device 404 to collect relevant information such as IMU readings, speed, etc. The harsh brakes, which have a lower threshold than harsh crashes, were identified when the driver applied brakes forcefully. Additionally, datasets on harsh turns, indicating instances where the driver swerved, were examined. Iteratively, positive cases were collected by deploying the model, identifying true positives, and incorporating them into the training process.

A feature 902 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

The more accurate the training data is, the more accurate the ML model 916 will be. Further, according to some examples, a large number of images is used for the training, such as the images from 15,000 videos.

In one example, the features 902 may be of different types and may include one or more of outward images 903 from outward videos, inward images 904 of the cabin, geography 905, speed 906, driver identifier 907 (ID), industry ID 908, customer ID 909, trip duration 910, etc.

The speed 906 may be used to avoid detecting CW when the speed is below a predetermined threshold. Further, the industry ID provides valuable information, as different industries tend to have different requirements associated with types of vehicles, duration of trips, number of stops, etc. Some examples of types of industry include transportation & warehousing, wholesale trade, field services, passenger transit, construction, consumer products, retail trade, food & beverage, manufacturing, health care & social assistance, etc. Further, the trip duration 910 may also influence the estimates, as CW events are more probable to occur after the driver has been driving for a long time. The inward images may assist in detecting LD when the driver shows fatigue or inattentive behavior.

During training 914, the ML program, also referred to as ML algorithm or ML tool, analyzes the training data 912 based on identified features 902 and configuration parameters defined for the training. The result of the training 914 is the ML model 916, which is capable of taking inputs to produce assessments. Additionally, the result of the training is the frame feature extractor 704 that receives as input the vector with pixel information of an image frame and outputs the corresponding feature vector in the n-dimensional space.

Training an ML algorithm involves analyzing large amounts of data (e.g., from several gigabytes to a terabyte or more) in order to find data correlations. The ML algorithms utilize the training data 912 to find correlations among the identified features 902 that affect the outcome or assessment 920. In some examples, the training data 912 includes labeled data, which is known data for one or more identified features 902 and one or more outcomes, such as the calculation of the CW probability.

The ML algorithms usually explore many possible functions and parameters before finding what the ML algorithms identify to be the best correlations within the data; therefore, training may make use of large amounts of computing resources and time.

When the ML model 916 is used to perform an assessment, new data 918 is provided as input to the ML model 916, and the ML model 916 generates the assessment 920 as output. For example, the input includes feature vectors for the most recent set of images sampled from the video (e.g., outward frames), and the ML model 916 calculates the CW probability.

In some examples, results obtained by the model 916 during operation (e.g., assessment 920 produced by the model in response to inputs) are used to improve the training data 912, which is then used to generate a newer version of the model. Thus, a feedback loop is formed to use the results obtained by the model to improve the model. In some examples, the ML program is one of a Residual Network (ResNet) model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

The improvement in the quality of the ML model 916 to estimate the occurrence of CW events will result in benefits for the service provider and the end customer. The service provider benefits because of the reduction in false positives with a more accurate model, and the fewer false positives, the less time has to be spent on reviewers to review the CW events. Similarly, the end customer will benefit when fewer CW events need to be reviewed by the reduction of false positives.

Figure 10:
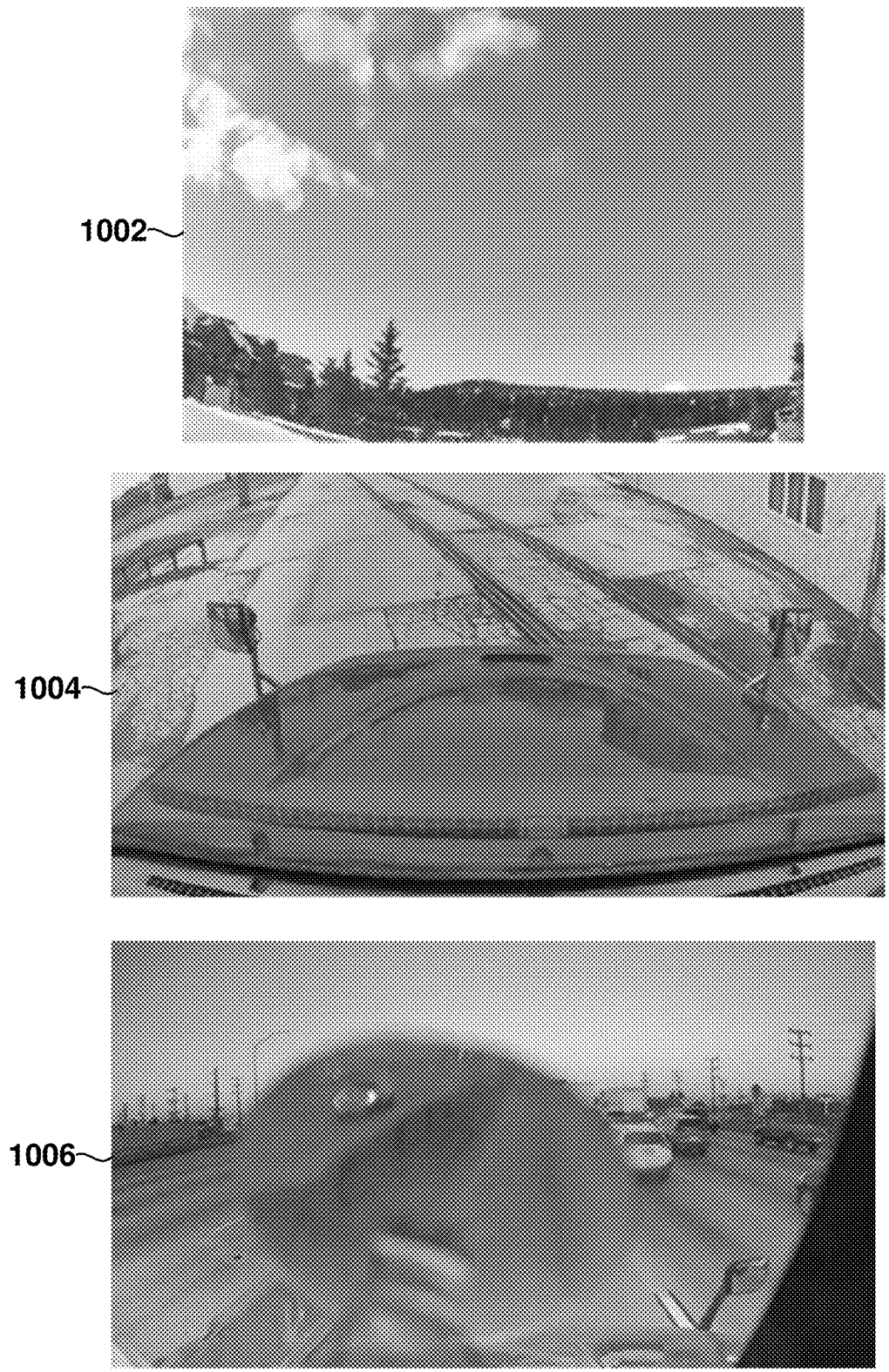
FIG. 10 shows examples of images from cameras with impaired views, according to some examples.

FIG. 10 shows examples of images from cameras with impaired views, according to some examples. In some examples, CW events are filtered out if the system detects that there is a camera impaired in the vehicle.

In some examples, the cam device 404 installed in a vehicle includes two cameras: an inward camera that captures inward videos covering the inside of the cabin and an outward camera that captures outward videos covering the road ahead of the vehicle. Some of the examples described herein are for the cam device 404 installed near the windshield and for view impediments of the outward camera. Still, the same principles may be utilized for cameras installed in other parts of the vehicle (e.g., roof, front bender, side mirror) and for inward cameras to identify when images of the driver cannot be accurately obtained.

There are several ways in which the view of a camera may be impaired, such as a misaligned camera pointing to the sky instead of the road ahead (image 1002), a misaligned camera pointing too low where only a part of the road ahead is visible and the horizon is not visible (image 1004), an obstruction in front of the camera (image 1006) (referred to herein as an obstructed camera), reflections from the outside, reflections from the inside (e.g., inside cabin light is on, objects placed on the dashboard), the camera is rotated causing the horizon to appear as a vertical line, dirt on the camera, difficult driving conditions (e.g., snow, heavy rain), camera mount is loose, malfunctioning camera, etc.

Typically, small obstructions or misalignments may not disrupt the proper operation of functions that rely on camera images. For example, a camera rotation of 100° to 20° may not affect the vision-recognition models. However, larger deviations will cause the functions to perform improperly and have an impaired camera.

As used herein, an impaired camera is a camera that is unable to provide clear and accurate images required for vehicle behavioral monitoring.

Figure 11:
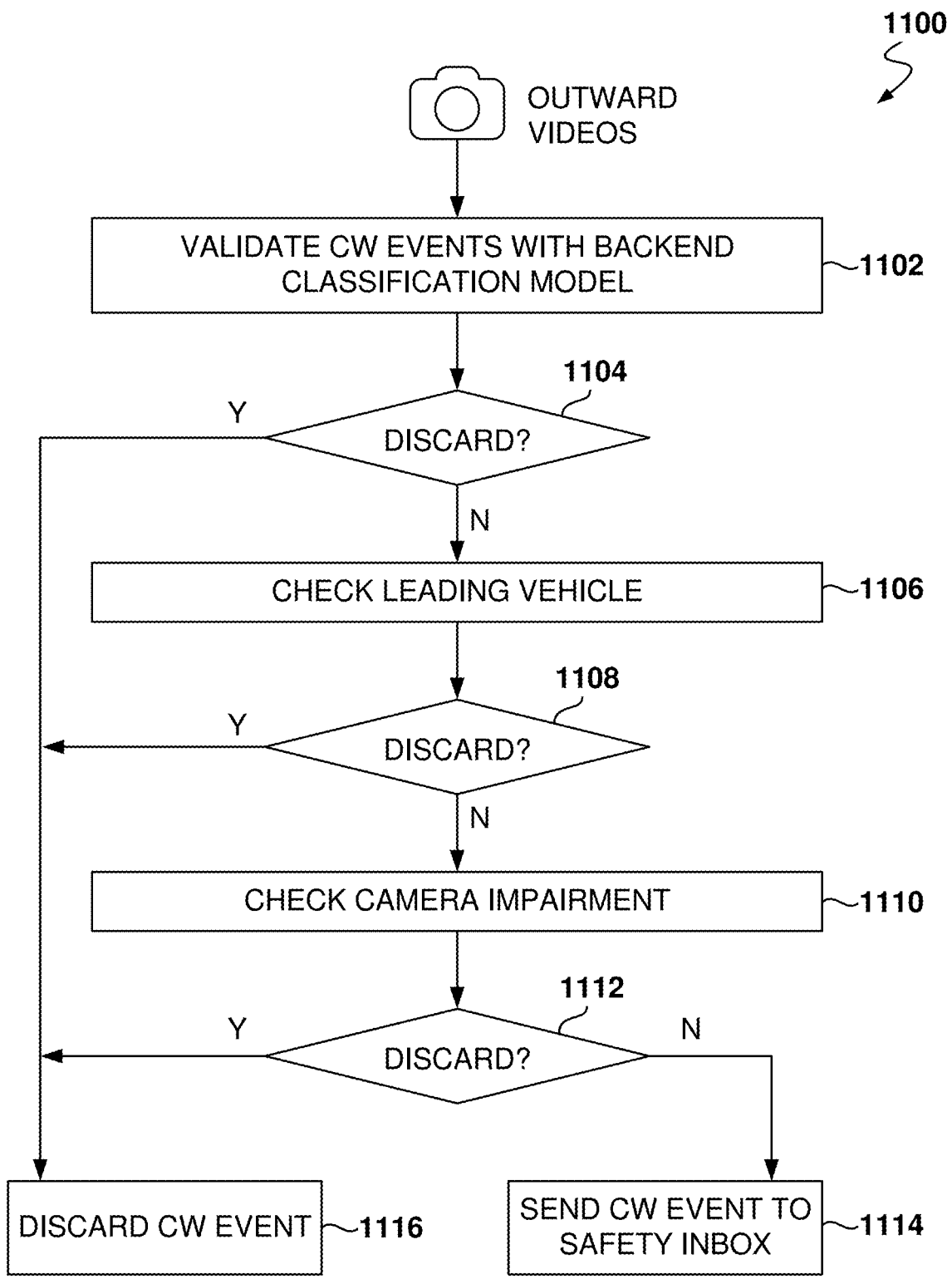
FIG. 11 is a flowchart of a method for processing CW events at the backend server, according to some examples.

FIG. 11 is a flowchart of a method 1100 for processing CW events at the backend server, according to some examples. While the various operations in this flowchart are presented and described sequentially, one of ordinary skill will appreciate that some or all of the operations may be executed in a different order, be combined or omitted, or be executed in parallel.

Initially, outward videos are captured by the camera at the vehicle. Operation 1102 involves validating CW events with a backend classification model based on the outward videos. For example, the backend CW classifier model 708 may determine that the video or image corresponds to a false positive; in this case, the CW event will be dismissed. The backend CW classifier model 708 serves to enhance the customer's dashboard experience by presenting a curated selection of collision videos, thereby offering a more focused and reliable overview of the incidents. By employing this robust model, the system can effectively differentiate between genuine collision scenarios and false positives.

At operation 1104, a check is made to determine whether the CW event should be discarded. If the decision is 'Yes,' the method 1100 proceeds to operation 1116, where the CW event is discarded. If the decision is 'No,' the method 1100 advances to operation 1106 to check for the position of the leading vehicle in the image.

At operation 1108, a check is made to determine if the CW event should be discarded based on the position of the leading vehicle check. For example, the lead vehicle may not be the vehicle that triggered the CW event because the CW event was triggered by the proximity of another vehicle in an adjacent lane. In this case, it will be determined that the CW event was a false positive, and the CW event will be dismissed. An image analyzer identifies various elements within a scene, including vehicles, lanes, lane markings, and the drivable area. By analyzing this information, it becomes possible to differentiate between vehicles in the same lane and those in other lanes.

If the result of the check at operation 1108 is 'Yes,' the method 1100 flows to operation 1116 to discard the CW event. If 'No,' the process moves to operation 1110 to check for camera impairment.

If it is detected that the camera was impaired, then the triggering of the CW event will be considered a false positive. For example, if the camera is obstructed, the method may have inferred that a spot on the camera may be an obstacle on the road.

At operation 1112, a check is made to determine if the camera was impaired and if the CW event should be discarded. If the camera was impaired and the result of the check is 'Yes,' method 1100 flows to operation 1116 to discard the event. If the result is 'No,' the CW event is deemed valid and sent to the safety inbox at operation 1114.

The illustrated example shows filtering mechanisms for the CW events. Other examples may utilize other filtering mechanisms to detect false positives.

One goal is to ensure a systematic and thorough validation of CW events. Each decision point acts as a filter to eliminate false positives and ensure that only pertinent events are forwarded for further action.

Figure 12:
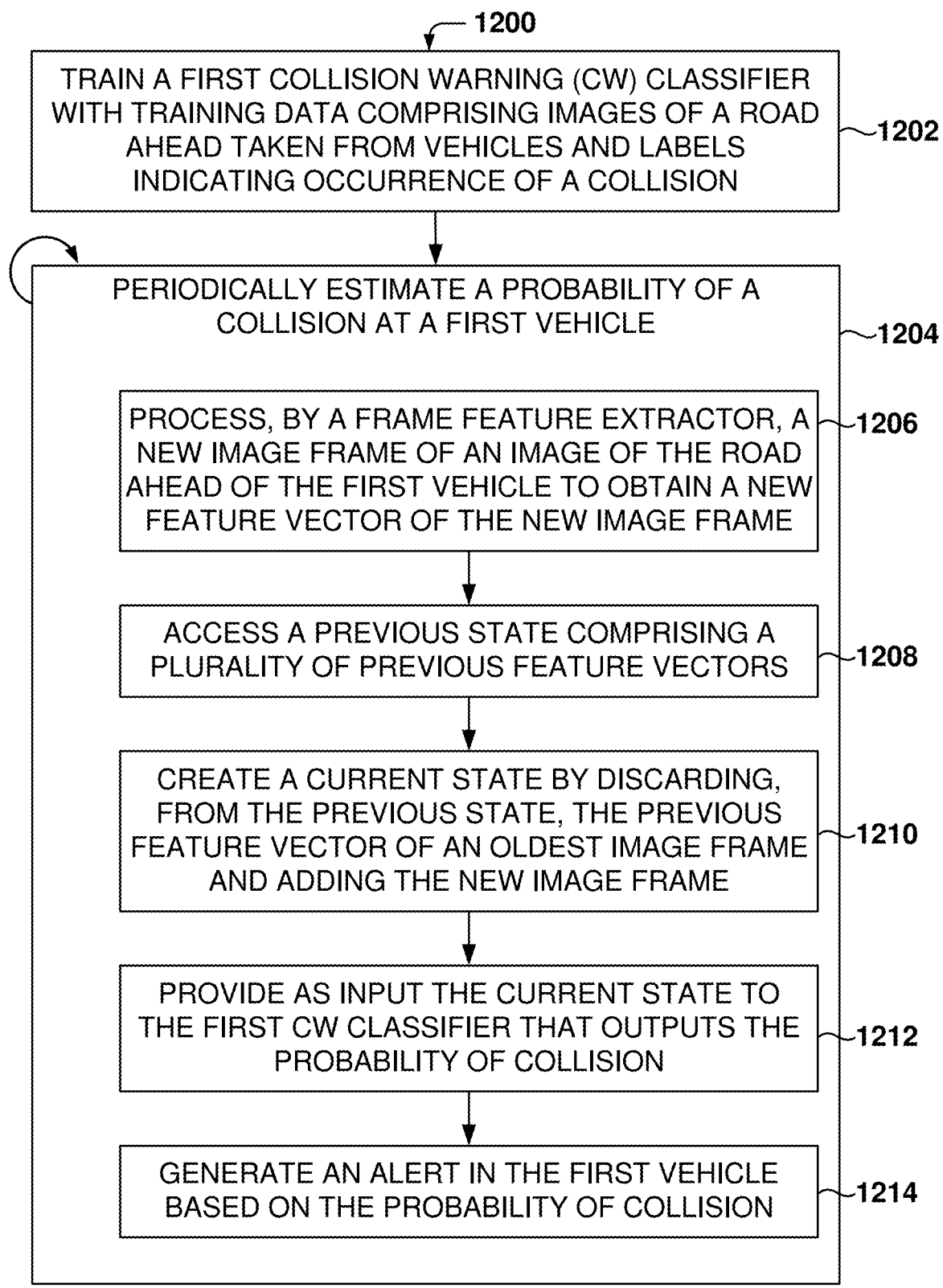
FIG. 12 is a flowchart of a method for detecting CW events, according to some examples.

FIG. 12 is a flowchart of a method 1200 for detecting CW events, according to some examples. While the various operations in this flowchart are presented and described sequentially, one of ordinary skill will appreciate that some or all of the operations may be executed in a different order, be combined or omitted, or be executed in parallel.

Operation 1202 is for training a first collision warning (CW) classifier with training data comprising images of the road ahead taken from vehicles and labels indicating the occurrence of a collision.

From operation 1202, the method 1200 flows to operation 1204 for periodically estimating the probability of a collision at a first vehicle. Estimating the probability of the collision comprises operations 1206, 1208, 1210, 1212, and 1214.

Operation 1206 is for processing, by a frame feature extractor, a new image frame of an image of the road ahead of the first vehicle to obtain a new feature vector of the new image frame.

From operation 1206, the method 1200 flows to operation 1208 to access a previous state comprising a plurality of previous feature vectors.

From operation 1208, the method 1200 flows to operation 1210 for creating a current state by discarding, from the previous state, the previous feature vector of the oldest image frame and adding the new image frame.

From operation 1210, the method 1200 flows to operation 1212 for providing as input the current state to the first CW classifier that outputs the probability of collision.

From operation 1212, the method 1200 flows to operation 1214 for generating an alert in the first vehicle based on the probability of collision.

Given the disclosure above, various examples are set forth below. It should be noted that one or more features of an example, taken in isolation or combination, should be considered within the disclosure of this application.

In some examples, the method 1200 further comprises sending, in response to the alert in the first vehicle, information about a CW event to a server, the information about the CW event comprising a video of the CW event captured by an outward camera.

In some examples, the method 1200 further comprises utilizing a second CW classifier at a server to validate a CW event based on a video of the CW event received from the first vehicle and discarding the CW event at the server based on the validation.

In some examples, the method 1200 further comprises analyzing, at a server, a video of a CW event to determine a position of a lead vehicle; and performing first filtering of the CW event at the server based on the lead vehicle causing a detection of the CW event.

In some examples, the method 1200 further comprises analyzing, at a server, a video of a CW event to determine occurrence of camera impairment while capturing the video; and performing second filtering of the CW event at the server based on the detection of the camera impairment.

In some examples, the processing of the new image frame by the frame feature extractor further comprises creating a pixel vector comprising pixel values of the new image frame, and providing the pixel vector as input to the frame feature extractor that outputs the new feature vector.

In some examples, the training data comprises a first plurality of images associated with collisions and a second plurality of images associated with lack of collisions.

In some examples, the method 1200 further comprises providing, by a server, a user interface (UI) to review CW events in a safety inbox configured to store driver behavior events.

In some examples, the image of the road ahead of the first vehicle is captured by an outward camera in a cam device installed on a windshield of the first vehicle.

In some examples, the new feature vector comprises 512 real numbers.

Another general aspect is for a system that includes a memory comprising instructions and one or more computer processors. The instructions, when executed by the one or more computer processors, cause the one or more computer processors to perform operations comprising: training a first collision warning (CW) classifier with training data comprising images of a road ahead taken from vehicles and labels indicating occurrence of a collision; and periodically estimating a probability of a collision at a first vehicle, wherein estimating the probability of the collision comprises: processing, by a frame feature extractor, a new image frame of an image of the road ahead of the first vehicle to obtain a new feature vector of the new image frame; accessing a previous state comprising a plurality of previous feature vectors; creating a current state by discarding, from the previous state, the previous feature vector of an oldest image frame and adding the new image frame; providing as input the current state to the first CW classifier that outputs the probability of collision; and generating an alert in the first vehicle based on the probability of collision.

In yet another general aspect, a tangible machine-readable storage medium (e.g., a non-transitory storage medium) includes instructions that, when executed by a machine, cause the machine to perform operations comprising: training a first collision warning (CW) classifier with training data comprising images of a road ahead taken from vehicles and labels indicating occurrence of a collision; and periodically estimating a probability of a collision at a first vehicle, wherein estimating the probability of the collision comprises: processing, by a frame feature extractor, a new image frame of an image of the road ahead of the first vehicle to obtain a new feature vector of the new image frame; accessing a previous state comprising a plurality of previous feature vectors; creating a current state by discarding, from the previous state, the previous feature vector of an oldest image frame and adding the new image frame; providing as input the current state to the first CW classifier that outputs the probability of collision; and generating an alert in the first vehicle based on the probability of collision.

Figure 13:
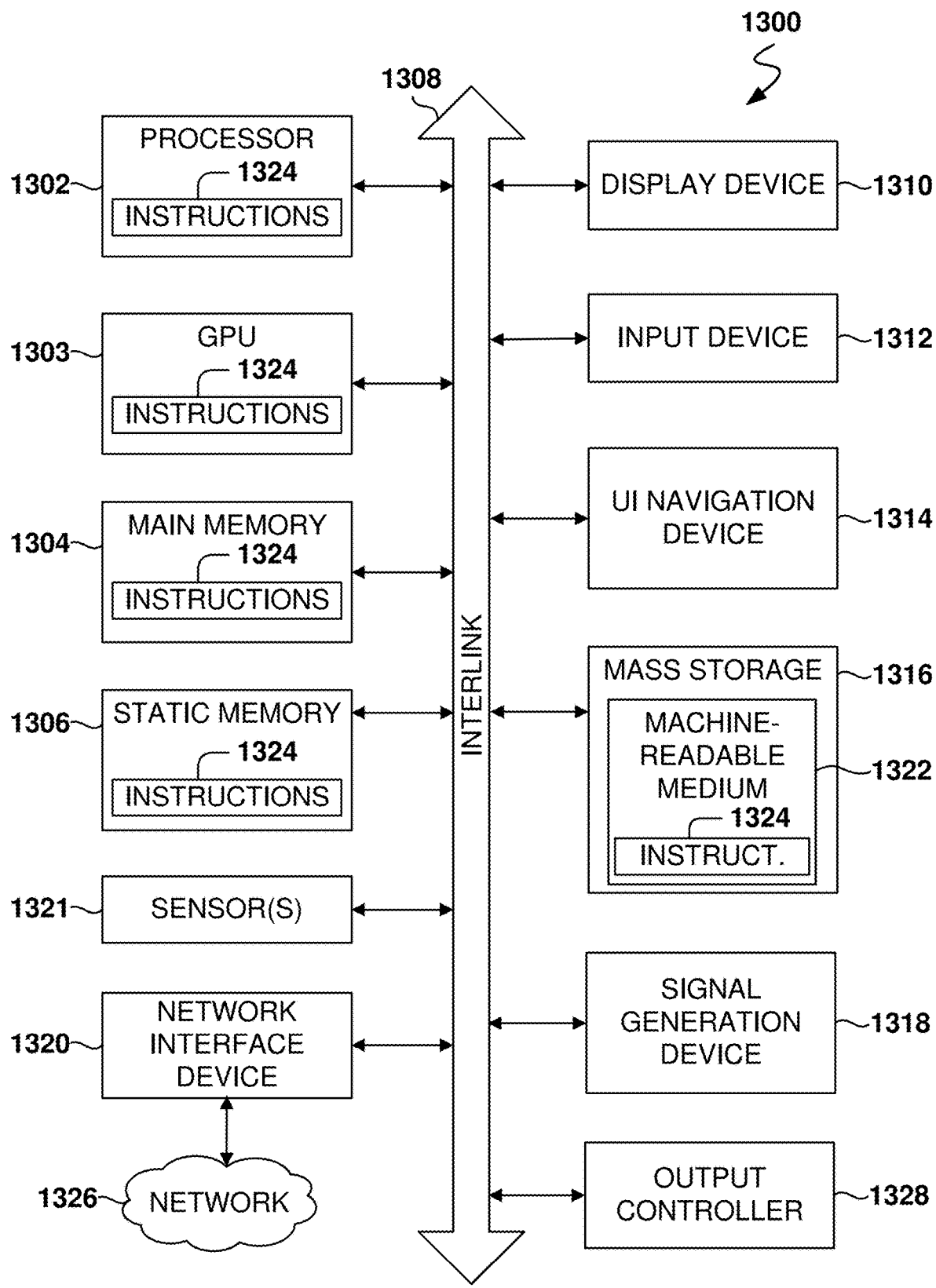
FIG. 13 is a block diagram illustrating an example of a machine upon or by which one or more example process examples described herein may be implemented or controlled.

FIG. 13 is a block diagram illustrating an example of a machine 1300 upon or by which one or more example process examples described herein may be implemented or controlled. In alternative examples, the machine 1300 may operate as a standalone device or be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1300 (e.g., computer system) may include a hardware processor 1302 (e.g., a central processing unit (CPU), a hardware processor core, or any combination thereof), a graphics processing unit (GPU 1303), a main memory 1304, and a static memory 1306, some or all of which may communicate with each other via an interlink 1308 (e.g., bus). The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1302 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1302 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1302 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1302 may be emulated in software, running on a physical processor, as a virtual processor or virtual circuit. The virtual processor may behave like an independent processor but is implemented in software rather than hardware.

The mass storage device 1316 may include a machine-readable medium 1322 on which one or more sets of data structures or instructions 1324 (e.g., software) embodying or utilized by any of the techniques or functions described herein. The instructions 1324 may also reside, completely or at least partially, within the main memory 1304, within the static memory 1306, within the hardware processor 1302, or the GPU 1303 during execution thereof by the machine 1300. For example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database and associated caches and servers) configured to store one or more instructions 1324.

The term "machine-readable medium" may include any medium that is capable of storing, encoding, or carrying instructions 1324 for execution by the machine 1300 and that causes the machine 1300 to perform any one or more of the techniques of the present disclosure or that is capable of storing, encoding, or carrying data structures used by or associated with such instructions 1324. Non-limiting machine-readable medium examples may include solid-state memories and optical and magnetic media. For example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
   training a first collision warning (CW) classifier with training data comprising images of a road ahead taken from vehicles, speed of the vehicles, and labels indicating occurrence of a collision; and
   periodically estimating a probability of a collision at a first vehicle, wherein estimating the probability of the collision comprises:
      processing, by a frame feature extractor, a new image frame of an image of the road ahead of the first vehicle to obtain a new feature vector of the new image frame;
      accessing a previous state comprising a plurality of previous feature vectors;
      creating a current state by discarding, from the previous state, the previous feature vector of an oldest image frame and adding the new image frame to generate a plurality of current feature vectors;
      providing as input the current state with the plurality of current feature vectors to the first CW classifier that outputs the probability of collision; and
      generating an alert in the first vehicle based on the probability of collision.

2. The method as recited in claim 1, further comprising:
   sending, in response to the alert in the first vehicle, information about a CW event to a server, the information about the CW event comprising a video of the CW event captured by an outward camera.

3. The method as recited in claim 1, further comprising:
   utilizing a second CW classifier at a server to validate a CW event based on a video of the CW event received from the first vehicle; and
   discarding the CW event at the server based on the validation.

4. The method as recited in claim 1, further comprising:
   analyzing, at a server, a video of a CW event to determine a position of a lead vehicle; and performing first filtering of the CW event at the server based on the lead vehicle causing a detection of the CW event.

5. The method as recited in claim 1, further comprising:
analyzing, at a server, a video of a CW event to determine occurrence of camera impairment while capturing the video; and
performing second filtering of the CW event at the server based on detection of the camera impairment.

6. The method as recited in claim 1, wherein the processing of the new image frame by the frame feature extractor further comprises:
creating a pixel vector comprising pixel values of the new image frame; and
providing the pixel vector as input to the frame feature extractor that outputs the new feature vector.

7. The method as recited in claim 1, wherein the training data comprises a first plurality of images associated with collisions and a second plurality of images associated with lack of collisions.

8. The method as recited in claim 1, further comprising:
providing, by a server, a user interface (UI) to review CW events in a safety inbox configured to store driver behavior events.

9. The method as recited in claim 1, wherein the image of the road ahead of the first vehicle is captured by an outward camera in a cam device installed on a windshield of the first vehicle.

10. The method as recited in claim 1, wherein the new feature vector comprises 512 real numbers.

11. A system comprising:
a memory comprising instructions; and
one or more computer processors, wherein the instructions, when executed by the one or more computer processors, cause the system to perform operations comprising:
training a first collision warning (CW) classifier with training data comprising images of a road ahead taken from vehicles, speed of the vehicles, and labels indicating occurrence of a collision; and
periodically estimating a probability of a collision at a first vehicle, wherein estimating the probability of the collision comprises:
processing, by a frame feature extractor, a new image frame of an image of the road ahead of the first vehicle to obtain a new feature vector of the new image frame;
accessing a previous state comprising a plurality of previous feature vectors;
creating a current state by discarding, from the previous state, the previous feature vector of an oldest image frame and adding the new image frame to generate a plurality of current feature vectors;
providing as input the current state with the plurality of current feature vectors to the first CW classifier that outputs the probability of collision; and
generating an alert in the first vehicle based on the probability of collision.

12. The system as recited in claim 11, wherein the instructions further cause the one or more computer processors to perform operations comprising:
sending, in response to the alert in the first vehicle, information about a CW event to a server, the information about the CW event comprising a video of the CW event captured by an outward camera.

13. The system as recited in claim 11, wherein the instructions further cause the one or more computer processors to perform operations comprising:
utilizing a second CW classifier at a server to validate a CW event based on a video of the CW event received from the first vehicle; and
discarding the CW event at the server based on the validation.

14. The system as recited in claim 11, wherein the instructions further cause the one or more computer processors to perform operations comprising:
analyzing, at a server, a video of a CW event to determine a position of a lead vehicle; and
performing first filtering of the CW event at the server based on the lead vehicle causing a detection of the CW event.

15. The system as recited in claim 11, wherein the instructions further cause the one or more computer processors to perform operations comprising:
analyzing, at a server, a video of a CW event to determine occurrence of camera impairment while capturing the video; and
performing second filtering of the CW event at the server based on detection of the camera impairment.

16. A non-transitory machine-readable storage medium including instructions that, when executed by a machine, cause the machine to perform operations comprising:
training a first collision warning (CW) classifier with training data comprising images of a road ahead taken from vehicles, speed of the vehicles, and labels indicating occurrence of a collision; and
periodically estimating a probability of a collision at a first vehicle, wherein estimating the probability of the collision comprises:
processing, by a frame feature extractor, a new image frame of an image of the road ahead of the first vehicle to obtain a new feature vector of the new image frame;
accessing a previous state comprising a plurality of previous feature vectors;
creating a current state by discarding, from the previous state, the previous feature vector of an oldest image frame and adding the new image frame to generate a plurality of current feature vectors;
providing as input the current state with the plurality of current feature vectors to the first CW classifier that outputs the probability of collision; and
generating an alert in the first vehicle based on the probability of collision.

17. The non-transitory machine-readable storage medium as recited in claim 16, wherein the machine further performs operations comprising:
sending, in response to the alert in the first vehicle, information about a CW event to a server, the information about the CW event comprising a video of the CW event captured by an outward camera.

18. The non-transitory machine-readable storage medium as recited in claim 16, wherein the machine further performs operations comprising:
utilizing a second CW classifier at a server to validate a CW event based on a video of the CW event received from the first vehicle; and
discarding the CW event at the server based on the validation.

19. The non-transitory machine-readable storage medium as recited in claim 16, wherein the machine further performs operations comprising:

analyzing, at a server, a video of a CW event to determine a position of a lead vehicle; and performing first filtering of the CW event at the server based on the lead vehicle causing a detection of the CW event.

20. The non-transitory machine-readable storage medium as recited in claim 16, wherein the machine further performs operations comprising:

analyzing, at a server, a video of a CW event to determine occurrence of camera impairment while capturing the video; and performing second filtering of the CW event at the server based on detection of the camera impairment.

\* \* \* \* \*